United States Patent
Piedra et al.

(10) Patent No.: US 11,235,948 B2
(45) Date of Patent: Feb. 1, 2022

(54) DYNAMIC COMPENSATION CONTROL FOR ELEVATOR SYSTEMS

(71) Applicant: Otis Elevator Company, Farmington, CT (US)

(72) Inventors: Edward Piedra, Chicopee, MA (US); Randy Roberts, Hebron, CT (US); David Ginsberg, Granby, CT (US); Ronnie E. Thebeau, Haddam, CT (US); Konda Reddy Chevva, Ellington, CT (US); XiaoBin Tang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 946 days.

(21) Appl. No.: 15/924,687

(22) Filed: Mar. 19, 2018

(65) Prior Publication Data
US 2018/0273343 A1    Sep. 27, 2018

(30) Foreign Application Priority Data
Mar. 24, 2017    (CN) .......................... 201710186023.X

(51) Int. Cl.
*B66B 1/30*    (2006.01)
*B66B 1/44*    (2006.01)
(Continued)

(52) U.S. Cl.
CPC .................. *B66B 1/30* (2013.01); *B66B 1/28* (2013.01); *B66B 1/3476* (2013.01);
(Continued)

(58) Field of Classification Search
USPC ....................................................... 187/247
See application file for complete search history.

(56) References Cited

U.S. PATENT DOCUMENTS

| 4,094,385 A | 6/1978 | Maeda et al. |
| 4,337,846 A | 7/1982 | Yonemoto et al. |

(Continued)

FOREIGN PATENT DOCUMENTS

| CN | 203474152 | 3/2014 |
| JP | 2005289627 | 10/2005 |

(Continued)

OTHER PUBLICATIONS

European Search Report, European Application No. 18164069.9, dated Aug. 22, 2018, European Patent Office; European Search Report 7 pages.

*Primary Examiner* — Christopher Uhlir
(74) *Attorney, Agent, or Firm* — Cantor Colburn LLP

(57) ABSTRACT

Methods and systems of controlling elevators including detecting a landing stop for an elevator car, measuring load information associated with the stop, controlling stopping of the elevator at the landing using a machine based on at least one of the detected landing and the measured load information and performing dynamic compensation control of a motion state of the elevator with a computing system and the elevator machine. The dynamic compensation control includes receiving motion state information related to at least one motion state of the elevator car at the computing system, receiving the landing and load information at the computing system, applying a filter to the received information and generating a first control signal, and producing a control output from the first control signal to control the elevator machine to minimize oscillations, vibrations, excessive position deflections, and/or bounce of the elevator car at the detected landing.

17 Claims, 4 Drawing Sheets

(51) Int. Cl.
    *B66B 7/04*               (2006.01)
    *B66B 1/28*               (2006.01)
    *B66B 1/34*               (2006.01)
    *B66B 9/00*               (2006.01)
    *B66B 5/00*               (2006.01)
    *G05B 15/02*              (2006.01)

(52) U.S. Cl.
    CPC .............. *B66B 1/3492* (2013.01); *B66B 1/44* (2013.01); *B66B 5/0018* (2013.01); *B66B 9/00* (2013.01); *G05B 15/02* (2013.01); *B66B 2201/00* (2013.01); *G05B 2219/41232* (2013.01)

(56) References Cited

U.S. PATENT DOCUMENTS

| | | | |
|---|---|---|---|
| 4,433,756 A | 2/1984 | Caputo et al. | |
| 4,570,755 A | 2/1986 | Tsai | |
| 5,848,671 A | 12/1998 | Kattainen | |
| 6,283,252 B1 | 9/2001 | Lee | |
| 6,435,315 B1 | 8/2002 | Zaharia | |
| 7,360,630 B2 * | 4/2008 | Brant | B66B 1/40 |
| | | | 187/284 |
| 7,546,903 B2 | 6/2009 | Kattainen et al. | |
| 7,571,791 B2 | 8/2009 | Finn et al. | |
| 7,597,176 B2 * | 10/2009 | Zaharia | B66B 1/3492 |
| | | | 187/394 |
| 8,360,209 B2 * | 1/2013 | Roberts | B66B 1/40 |
| | | | 187/291 |
| 9,022,178 B2 * | 5/2015 | Foschini | B66B 1/302 |
| | | | 187/295 |
| 9,422,133 B2 | 8/2016 | Rebillard et al. | |
| 9,469,501 B2 | 10/2016 | Lee | |
| 10,703,607 B2 * | 7/2020 | Altenburger | B66B 9/00 |
| 2015/0217968 A1 | 8/2015 | Huff et al. | |
| 2017/0022027 A1 | 1/2017 | Romnes | |

FOREIGN PATENT DOCUMENTS

| | | |
|---|---|---|
| JP | 5659085 | 1/2015 |
| WO | 0170613 A1 | 9/2001 |
| WO | 2009108186 A1 | 9/2009 |
| WO | 2013118317 A1 | 8/2013 |
| WO | 2014137345 A1 | 9/2014 |
| WO | 2015119608 A1 | 8/2015 |
| WO | 2015126377 A1 | 8/2015 |
| WO | 2016067385 A1 | 5/2016 |

\* cited by examiner

DYNAMIC COMPENSATION CONTROL FOR ELEVATOR SYSTEMS

CROSS REFERENCE TO RELATED APPLICATIONS

This application claims priority to Chinese Patent Application No. 201710186023.X, filed Mar. 24, 2017, the entire contents of which is incorporated herein by reference.

BACKGROUND

The subject matter disclosed herein generally relates to elevator systems and, more particularly, to dynamic compensation control systems and methods of control for elevator systems.

An elevator system typically includes a plurality of belts or ropes (load bearing members) that move an elevator car vertically within a hoistway or elevator shaft between a plurality of elevator landings. When the elevator car is stopped at a respective one of the elevator landings, changes in magnitude of a load within the car can cause changes in vertical position of the car relative to the landing. The elevator car can move vertically down relative to the elevator landing, for example, when one or more passengers and/or cargo move from the landing into the elevator car. In another example, the elevator car can move vertically up relative to the elevator landing when one or more passengers and/or cargo move from the elevator car onto the landing. Such changes in the vertical position of the elevator car can be caused by soft hitch springs and/or stretching and/or contracting of the load bearing members, particularly where the elevator system has a relatively large travel height and/or a relatively small number of load bearing members. Under certain conditions, the stretching and/or contracting of the load bearing members and/or hitch springs can create disruptive oscillations in the vertical position of the elevator car, e.g., an up and down "bounce" motion.

BRIEF SUMMARY

According to some embodiments, methods of controlling elevator systems are provided. The methods includes detecting a landing of a stop for an elevator car, measuring load information associated with the detected stop, controlling stopping of the elevator car at the landing using an elevator machine based on at least one of the detected landing and the measured load information, and performing dynamic compensation control of a motion state of the elevator car relative to the landing with a computing system and the elevator machine. The dynamic compensation control includes receiving motion state information related to at least one motion state of the elevator car at the computing system, receiving the landing and load information at the computing system, applying a filter to the received information and generating a first control signal, producing a control output from the first control signal to control the elevator machine to minimize oscillations, vibrations, excessive position deflections, and/or bounce of the elevator car at the detected landing.

In addition to one or more of the features described herein, or as an alternative, further embodiments of the methods may include that the control output is a current to generate a motor torque at the elevator machine.

In addition to one or more of the features described herein, or as an alternative, further embodiments of the methods may include applying a limiter to the first control signal to produce a second control signal.

In addition to one or more of the features described herein, or as an alternative, further embodiments of the methods may include receiving the second control signal at a machine velocity controller, receiving a motor velocity signal related to the motor velocity of the elevator machine, and generating a third control signal.

In addition to one or more of the features described herein, or as an alternative, further embodiments of the methods may include receiving the third control signal at a machine torque controller and outputting the control output from the machine torque controller to control a torque of the elevator machine.

In addition to one or more of the features described herein, or as an alternative, further embodiments of the methods may include that the load information comprises at least one of (i) a current load within the elevator car, (ii) an estimated change in load due to load exiting the elevator car onto the landing, or (iii) an estimated change in load due to load entering the elevator car from the landing.

In addition to one or more of the features described herein, or as an alternative, further embodiments of the methods may include determining the dynamic compensation control is not required based on at least one of the load information and the detected landing.

In addition to one or more of the features described herein, or as an alternative, further embodiments of the methods may include that the filter is a Notch filter.

In addition to one or more of the features described herein, or as an alternative, further embodiments of the methods may include that the Notch filter is adjusted based on hoistway dynamics or performance requirements.

According to other embodiments, elevator control systems are provided. The elevator control systems include an elevator machine operably connected to an elevator car located within an elevator shaft, at least one motion state sensor arranged to detect a motion state of the elevator car within the elevator shaft, at least one load sensor arranged to detect a load of the elevator car, and a computing system in communication with the at least one motion state sensor and the at least one load sensor, the computing system configured to perform dynamic compensation control of the elevator car. The dynamic compensation control includes receiving motion state information related to the elevator car at the computing system to generate a motion state signal, receiving landing and load information signals at the computing system from the at least one motion state sensor and the at least one load sensor, applying a filter to the velocity, position, landing, and load information signals and generating a first control signal, and producing a control output from the first control signal to control the elevator machine to minimize oscillations, vibrations, excessive position deflections, and/or bounce of the elevator car at the detected landing.

In addition to one or more of the features described herein, or as an alternative, further embodiments of the systems may include that the control output is a current to generate a motor torque at the elevator machine.

In addition to one or more of the features described herein, or as an alternative, further embodiments of the systems may include applying a limiter to the first control signal to produce a second control signal.

In addition to one or more of the features described herein, or as an alternative, further embodiments of the systems may include receiving the second control signal at a machine velocity controller, receiving a motor velocity signal related to the motor velocity of the elevator machine, and generating a third control signal.

In addition to one or more of the features described herein, or as an alternative, further embodiments of the systems may include receiving the third control signal at a machine torque controller and outputting the control output from the machine torque controller to control a torque of the elevator machine.

In addition to one or more of the features described herein, or as an alternative, further embodiments of the systems may include that the load information comprises at least one of (i) a current load within the elevator car, (ii) an estimated change in load due to load exiting the elevator car onto the landing, or (iii) an estimated change in load due to load entering the elevator car from the landing.

In addition to one or more of the features described herein, or as an alternative, further embodiments of the systems may include determining the dynamic compensation control is not required based on at least one of the load information and the detected landing.

In addition to one or more of the features described herein, or as an alternative, further embodiments of the systems may include that the filter is a Notch filter.

In addition to one or more of the features described herein, or as an alternative, further embodiments of the systems may include that the Notch filter is adjusted based on at least one of (i) hoistway dynamics as directly or implied by car motion state sensing, (ii) load weighing sensors, (iii) performance requirements, or (iv) instantaneous detection of car load.

In addition to one or more of the features described herein, or as an alternative, further embodiments of the systems may include that the at least one motion state sensor comprises a plurality of sensing elements located on the elevator car and a corresponding set of tag elements located at each landing along the elevator shaft.

In addition to one or more of the features described herein, or as an alternative, further embodiments of the systems may include that the plurality of sensing elements and corresponding tag elements at each landing form overlapping detection regions.

Technical effects of embodiments of the present disclosure include dynamic compensation systems and methods of operation to provide high-bandwidth response and active oscillation, position, and vibration control of elevator systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
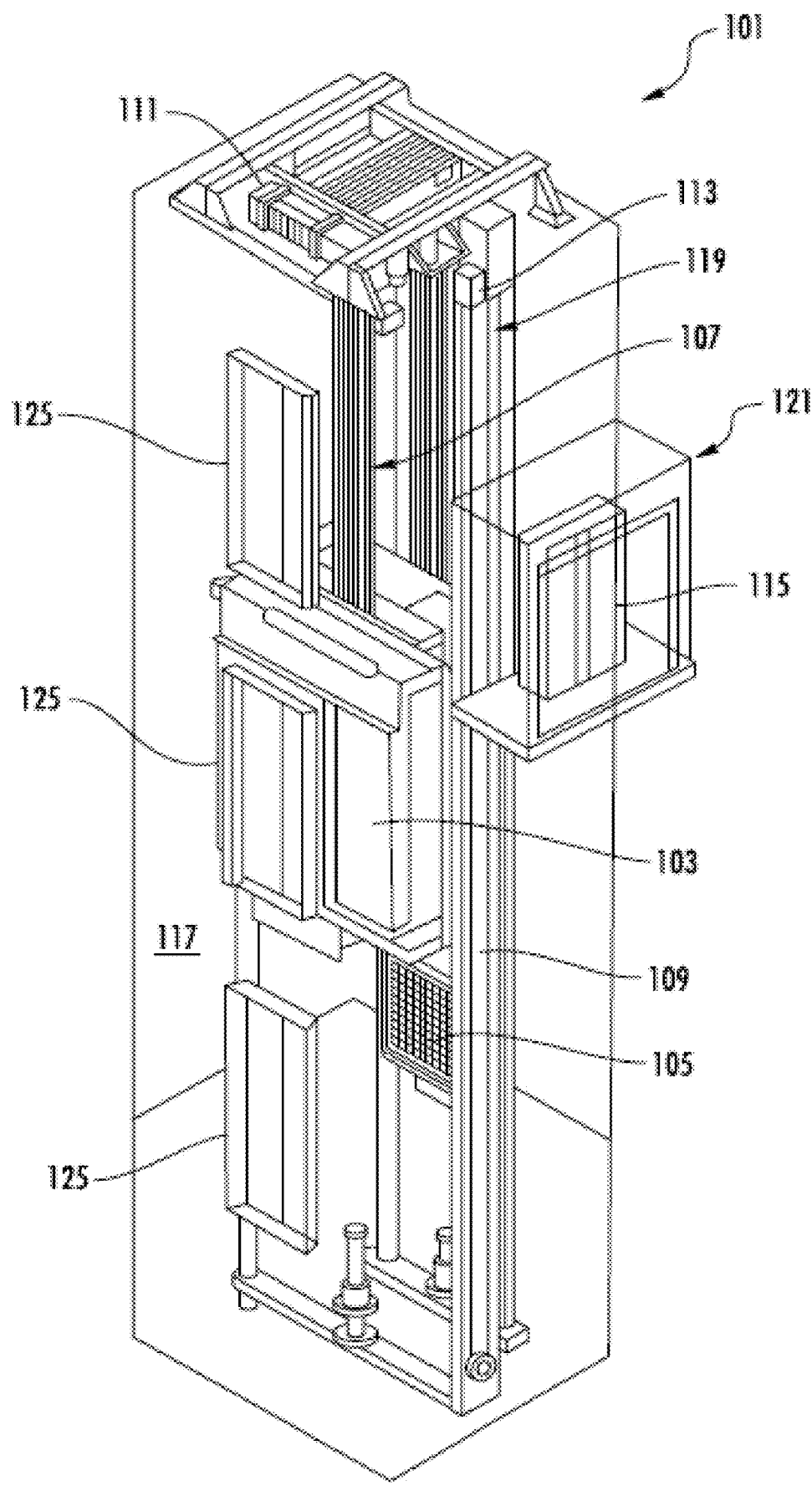
FIG. 1 is a schematic illustration of an elevator system that may employ various embodiments of the present disclosure.

As shown and described herein, various features of the disclosure will be presented. Various embodiments may have the same or similar features and thus the same or similar features may be labeled with the same reference numeral, but preceded by a different first number indicating the figure in which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, one or more load bearing members 107, a guide rail 109, a machine 111, a motion state sensor 113, and an elevator controller 115. As used herein, the term "motion state" includes, but is not limited to, position, velocity, and acceleration. That is, the motion state of the elevator car can be the absolute position of the car within an elevator shaft, the first derivation or change in position of the position of the car (e.g., velocity), or the second derivative or change in velocity of the car (e.g., acceleration). Accordingly, motion state is not limited to merely motion, but also includes a static or absolute position of the elevator car and movement of the car within the elevator shaft. The motion state sensor 113 can be an encoder, an optical sensor, or other type of sensor and/or sensor assembly as will be appreciated by those of skill in the art.

The elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The load bearing members 107 engage the machine 111, which is part of an overhead structure of the elevator system 101. The machine 111 is configured to control movement between the elevator car 103 and the counterweight 105. The motion state sensor 113 may be mounted on an upper sheave of a speed-governor system 119 and may be configured to provide motion state signals related to a motion state of the elevator car 103 within the elevator shaft 117. In other embodiments, the motion state sensor 113 may be directly mounted to a moving component of the machine 111, or may be located in other positions and/or configurations as known in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive motion state signals from the motion state sensor 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics or any other methods, may employ embodiments of the present disclosure. FIG. 1 is merely a non-limiting example presented for illustrative and explanatory purposes.

Embodiments provided herein are directed to apparatuses, systems, and methods related to elevator control at a landing, and particularly to a dynamic compensation systems to rapidly adjust and account for bounce, oscillations, and/or vibrations within an elevator system. For example, an elevator hover mode is a mode of operation that is used at landings when an elevator car may move up or down (e.g., bounce) due to load changes and/or extension/contraction of load bearing members (e.g., a continuous re-levelling feature). According to embodiments provided herein, an elevator system can enter or operate within a dynamic compensation control mode of operation based on detected and/or anticipated potential load changes and adjust motor control to accurately maintain an elevator's position within an elevator shaft. For example, an elevator system in accordance with embodiments of the present disclosure can provide a high-bandwidth response when approaching and stopping at a landing such that little to no bounce, oscillations, and/or vibration is experienced by passengers on the elevator car or entering/exiting the elevator car.

Figure 2:
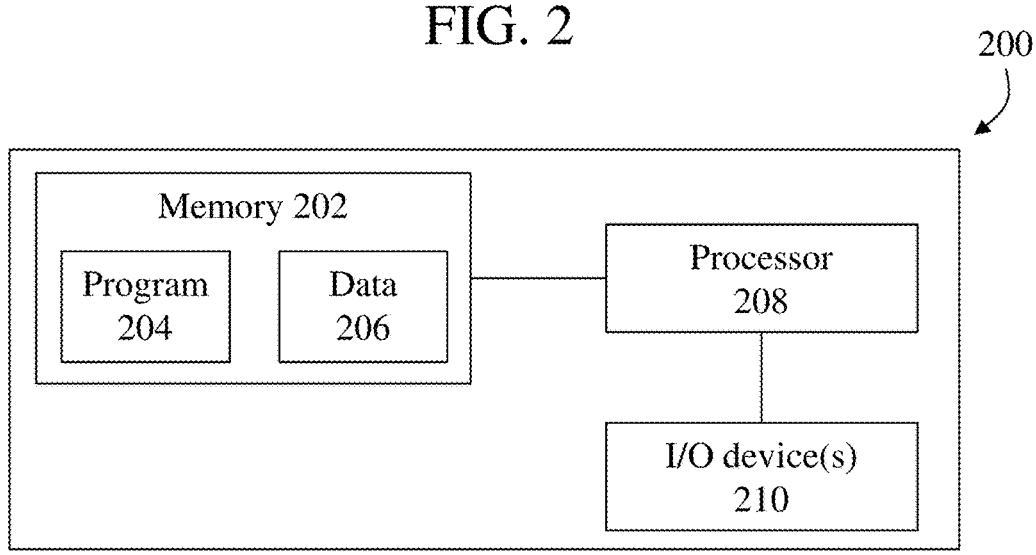
FIG. 2 is a schematic block diagram illustrating a computing system that may be configured for one or more embodiments of the present disclosure.

Referring now to FIG. 2, an example computing system 200 that can be incorporated into elevator systems of the present disclosure is shown. The computing system 200 may be configured as part of and/or in communication with an elevator controller, e.g., controller 115 shown in FIG. 1, and/or as part of a dynamic compensation control mode system as described herein. The computing system 200 includes a memory 202 which can store executable instructions and/or data associated with the dynamic compensation control mode system. The executable instructions can be stored or organized in any manner and at any level of abstraction, such as in connection with one or more applications, processes, routines, procedures, methods, etc. As an example, at least a portion of the instructions are shown in FIG. 2 as being associated with a dynamic compensation control mode program 204.

Further, as noted, the memory 202 may store data 206. The data 206 may include, but is not limited to, elevator car data, elevator modes of operation, commands, or any other type(s) of data as will be appreciated by those of skill in the art. The instructions stored in the memory 202 may be executed by one or more processors, such as a processor 208. The processor 208 may be operative on the data 206.

The processor 208, as shown, is coupled to one or more input/output (I/O) devices 210. In some embodiments, the I/O device(s) 210 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 210, in some embodiments, include communication components, such as broadband or wireless communication elements.

The components of the computing system 200 may be operably and/or communicably connected by one or more buses. The computing system 200 may further include other features or components as known in the art. For example, the computing system 200 may include one or more transceivers and/or devices configured to transmit and/or receive information or data from sources external to the computing system 200 (e.g., part of the I/O devices 210). For example, in some embodiments, the computing system 200 may be configured to receive information over a network (wired or wireless) or through a cable or wireless connection with one or more devices remote from the computing system 200 (e.g. direct connection to an elevator machine, etc.). The information received over the communication network can stored in the memory 202 (e.g., as data 206) and/or may be processed and/or employed by one or more programs or applications (e.g., program 204) and/or the processor 208.

The computing system 200 is one example of a computing system, controller, and/or control system that is used to execute and/or perform embodiments and/or processes described herein. For example, the computing system 200, when configured as part of an elevator control system, is used to receive commands and/or instructions and is configured to control operation of an elevator car through control of an elevator machine. For example, the computing system 200 can be integrated into or separate from (but in communication therewith) an elevator controller and/or elevator machine and operate as a portion of a dynamic compensation control system. As used herein, the term "dynamic compensation control system" refers to one or more components configured to control movement and, particularly, a dynamic compensation control mode of an elevator car, as described below.

The computing system 200 is configured to operate and/or control a dynamic compensation control mode of an elevator. The dynamic compensation control mode of operation is used to mitigate or significantly reduce elevator car bounce. Such elevator car bounce may be a result of long load bearing members (e.g., belts, ropes, cables, or other suspension mechanism) used to suspend and move the elevator car within an elevator shaft and/or as a result of changes in elevator car load (e.g., changes in weight pulling on the load bearing members). For example, in high-rise buildings, due to the length of the load bearing members, a suspended elevator car may bounce or move slightly when at a landing. Such effects may be observed in high rise elevator systems (e.g., systems within tall buildings) when the elevator car is at a relatively low landing (e.g., close to the ground floor of the building). In such instances, the load bearing members can be sufficiently extended and long that extension (e.g., stretching) or contraction of the load bearing members may occur. Such extension or contraction can cause the elevator car to move relative to a stopped position, even if brakes are engaged to prevent movement of the elevator car. That is, the movement of the elevator car can be independent of the operation of the machine that drives movement of the elevator car within the elevator shaft.

For example, an elevator system typically includes a plurality of load bearing members that are driven by an elevator machine to move an elevator car vertically within a hoistway or elevator shaft between a plurality of elevator landings (see, e.g., FIG. 1). When the elevator car is stopped at a respective one of the elevator landings, changes in magnitude of a load within the car (e.g., changes in weight) can cause changes in vertical position of the car relative to the landing, which can include velocity and/or acceleration, i.e., motion states. As discussed above, the term "motion state" includes, but is not limited to, position, velocity, and acceleration. That is, the motion state of the elevator car can be the absolute position of the car within an elevator shaft, the first derivation or change in position of the car (e.g., velocity), or the second derivative or change in velocity of the car (e.g., acceleration). Accordingly, motion state is not limited to merely motion, but also includes a static or absolute position of the elevator car and movement of the car within the elevator shaft.

For example, the elevator car can move vertically down relative to the elevator landing when one or more passengers and/or cargo move from the landing into the elevator car (e.g., positive load change). In another example, the elevator car can move vertically up relative to the elevator landing when one or more passengers and/or cargo move from the elevator car onto the landing (e.g., negative load change). The term "load change" as used herein includes persons, objects, cargo, things, etc. that may be loaded onto (e.g., enter) or unloaded from (e.g., exit) an elevator car. A positive load change is an increase in weight that is suspended by the load bearing members and a negative load change is a decrease in weight that is suspended by the load bearing members.

Such changes in the vertical position of the elevator car and/or other changes in the motion state of the elevator car can be caused by soft hitch springs, stretching and/or contracting of the load bearing members, and/or for various other reasons, particularly where the elevator system has a relatively large travel height and/or a relatively small number of load bearing members. Under certain conditions, the stretching and/or contracting of the load bearing members and/or hitch springs can create disruptive oscillations, position deflections, or vibrations in the motion state of the elevator car, e.g., an up and down motion of the elevator car.

In accordance with embodiments of the present disclosure, systems and processes for employing dynamic compensation control to minimize, reduce, or eliminate "bounce," oscillations, excessive position deflections, vibrations, etc. of elevator systems. That is, embodiments provided herein are directed to active vibration, high bandwidth, fast reacting processes that employ direct measurement of a motion state of an elevator car as feedback to the elevator machine to generate torque to compensate for sag or bounce during loading and unloading scenarios, such as at lower landings within high rise buildings/systems. The dynamic compensation control system monitors a motion state error at the car to generate a corrective action (e.g., motor torque). In some embodiments, the dynamic compensation control operation may be configured to be operational only at landings. When transitioning into a dynamic compensation control mode of operation, the added motion state feedback eliminates the potential for added sag or bounce that may be experienced in conventional hovering systems. Embodiments provided herein are directed to relatively "aggressive" car motion state feedback releveling control systems that can react quickly to real-time events and data related thereto.

Figure 3:
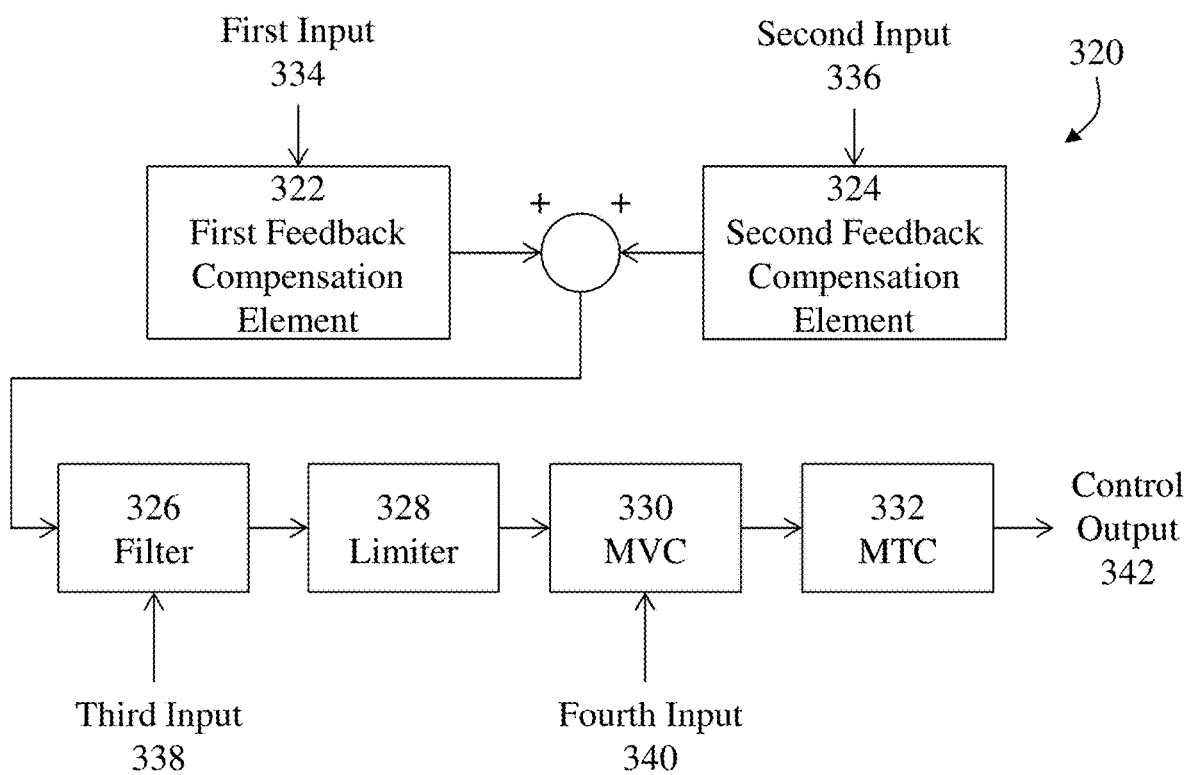
FIG. 3 is a schematic diagram of a dynamic compensation control system in accordance with an embodiment of the present disclosure.

Turning now to FIG. 3, a schematic diagram of a non-limiting embodiment of the present disclosure is shown. The schematic diagram illustrates a dynamic compensation control system 320. As shown, the dynamic compensation control system 320 includes a number of elements, as described herein, and various inputs. For example, as shown, the dynamic compensation control system 320 illustrates a first motion state feedback compensation element 322 (e.g., a car velocity feedback compensation element) and a second motion state feedback compensation element 324 (e.g., a car position feedback compensation element). In some embodiments, some or all of the elements of the dynamic compensation control system 320 can be implemented in a software configuration within a processor or other computing system (e.g., as shown in FIG. 2). The dynamic compensation control system 320 also illustrates a filter element 326, a limiter element 328, a machine velocity controller (MVC) element 330, and a machine torque controller (MTC) element 332.

In operation, and in accordance with an embodiment of the present disclosure, the first motion state feedback compensation element 322 receives first input 334 and the second motion state feedback compensation element 324 receives second input 336. The first input 334, in this embodiment, is a first motion state signal, such as car velocity. That is, in this embodiment, the first input 334 is formed of data and/or information related to the first motion state, e.g., velocity, of an elevator car within an elevator shaft. The first motion state data can be directly obtained through motion state sensors or other devices attached to or otherwise connected to the elevator car. In other embodiments or in combination therewith, the first motion state sensing can be based on monitoring or sensing rotational positions of elements of the elevator machine that drives the elevator car within the elevator shaft. Those of skill in the art will appreciate that other means and mechanisms can be employed to determine a motion state of the elevator car without departing from the scope of the present disclosure. As shown, the first input 334 is received by the first motion state feedback compensation element 322 from one or more motion state sensors (e.g., velocity sensors).

Similarly, the second motion state feedback compensation element 324 receives the second input 336 from one or more motion state sensors that are configured to monitor, detect, or otherwise determine a second motion state of the elevator car and output a second motion state signal. In some embodiments, the motion state sensors that generate the first input 334 and the second input 336 can be the same motion state sensors with various functional features configured to determine different motion states (e.g., position, velocity, acceleration) of an elevator car. Although described above with respect to two motion states (position and velocity) those of skill in the art will appreciate that any motion state and/or number of motion states can be used as inputs in accordance with various embodiments of the present disclosure.

In some embodiments, motion state sensors can include landing position sensors, such as vanes, that are employed to detect that the elevator car is at a particular landing or a relative position thereto, e.g., above or below the particular landing. Some systems use discrete sensors to divide motion states near the landing into two or more zones which indicate the position and/or other motion state of the car relative to the landing. However, direct sensing of small changes of the car position or other motion state within these zones may not be possible with the traditional discrete sensors. Such undetected or unsensed changes in motion state may be the result of load changes, stretching of load bearing members, etc. In some embodiments, the motion state sensing includes use of an accelerometer on the elevator car that is used to generate a motion state signal (e.g., car velocity). In such configurations, a mathematical integration of an acceleration measurement is used to obtain the velocity and a second integration can obtain car position, and thus three separate motion states can be obtained using a single motion state sensor. Further, as will be appreciated by those of skill in the art, the motion state sensors can be located on the elevator car and/or within the elevator shaft.

Figure 4B:
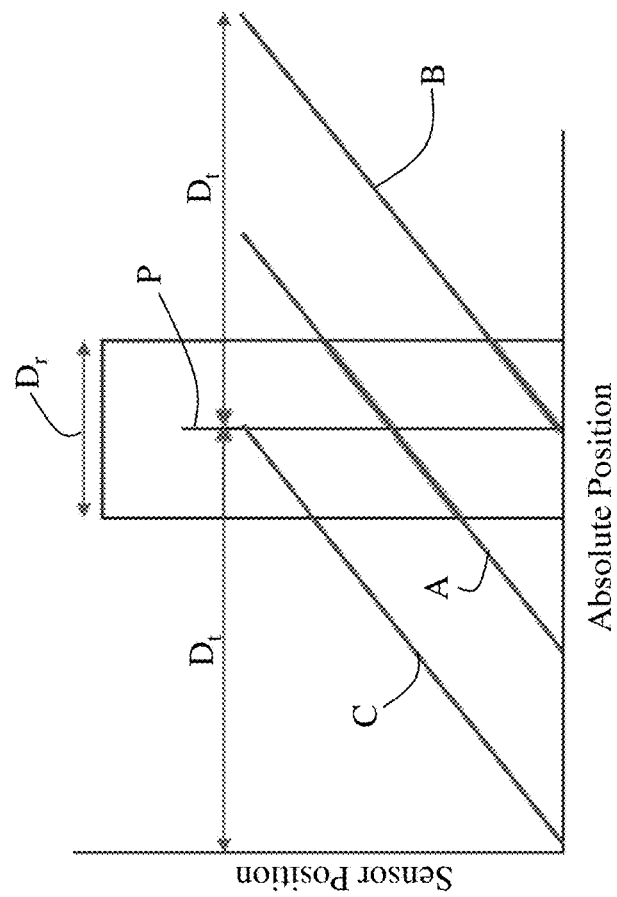
FIG. 4B is a plot illustration illustrating relative motion states as used with the motion state sensing assembly and system of FIG. 4A.
Figure 4A:
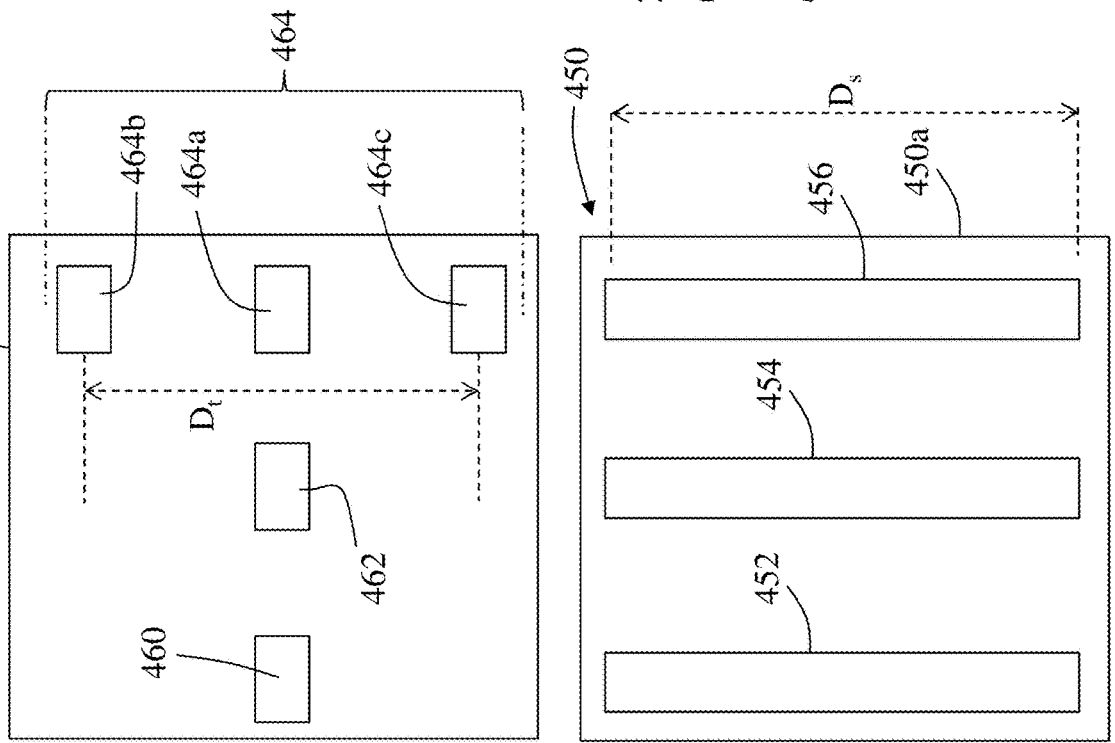
FIG. 4A is a schematic illustration of a motion state sensing assembly and system that can be employed with embodiments of the present disclosure.

Referring now to FIGS. 4A-4B, a non-limiting embodiment of the present disclosure including motion state sensors in the form of contactless linear inductive sensors is shown. The motion state sensors can be employed to provide direct, high-resolution measurement of car motion state(s) (e.g., position and/or velocity) relative to a landing. For example, as shown in FIG. 4A, an elevator car 450 can include a sensor assembly 450a having a plurality of sensors. As shown, the sensor assembly 450a includes a first sensor 452, a second sensor 454, and an optional third sensor 456. Each sensor 452, 454, 456 can include one or more sensing elements. Although shown in a specific example configuration, those of skill in the art will appreciate that an elevator car can be equipped with any number of sensors and/or sensing elements as part of the sensors.

To determine the position of the elevator car 450 relative to a landing 458, the landing 458 (and each landing in an elevator shaft) is configured with a tag assembly 458a. For example, as shown in FIG. 4A, the tag assembly 458a has a first tag 460, a second tag 462, and a third tag 464 having a first tag element 464a, a second tag element 464b, and a third tag element 464c. The position of the tag assembly 458a (and tags 460, 462, 464) is installed such that when the elevator car 450 is aligned with the landing 458 each of the sensors 452, 454, 456 of the sensor assembly 450a are positioned proximate to each of the tags 460, 462, 464 of the tag assembly 458a. As shown the tag elements 464a, 464b, 464c of the third tag 464 are spaced across a span of a tag spacing distance $D_t$ and the sensors 452, 454, 456 span an operational distance $D_s$, with the tag spacing distance $D_t$ and the sensor operational distance $D_s$ being approximately equal.

In one non-limiting example, an individual sensing element (452a, 454a, 456a, 456b, 456c) consists of a set of coils which inductively couples to a respective tag element (460a, 462a, 464a, 464b, 464c). Variations in the position of tag elements relative to respective sensing elements corresponds to a variation in inductance, i.e., the distance between a tag element and a sensing element is correlated to an inductance. An assembly of these sensors and tags provides various benefits for position detection. For example, the assembly, such as that shown in FIGS. 4A, provides for redundancy in the region where dynamic compensation can be performed and an extended stroke of the sensor beyond the length of just the sensor or tag.

In operation, to detect a position, the sensed position from each of the sensors 452, 454, 456 in the assembly is combined to calculate: (i) a true position of the car relative to the landing and (ii) safety signals permitting the doors to open while the car is in operation (e.g., in the releveling region). Additional tag(s) (not shown) can be included with encoded information to uniquely identify each floor (via frequency or position encoding).

FIG. 4B illustrates a plot of relative positions, with the vertical axis represents sensing element position and the horizontal axis representing absolute position. On the plot, a landing position P is shown indicating the relative position of the sensing elements A, B, C (corresponding to alphanumeric element labels of FIG. 4A) when the elevator car 450 is aligned with the landing 458. Further, as illustrated, a releveling region $D_r$ is shown within which motion state sensor feedback is provided to the dynamic compensation control system. Outside of the releveling region $D_r$, the elevator is operated using conventional motion state sensors. As shown, the lines A, B, C represent the relative positions reported for the various sensing elements all are positioned around the landing position P. As the elevator car 450 is moved away from the landing position P the third sensor 456 will transition to either tag element 464b or 464c. For example, if the elevator car 450 is moved upward relative to the landing 458, only the second tag element 464b will be visible to sensor 456 corresponding to line B. If the elevator car 450 is moved downward relative to the landing 458, only third tag element 464c will be visible to sensor 456 corresponding to line C. In this way, a continuous measurement of a motion state of an elevator car can be obtained beyond the stroke of a single sensor/tag combination.

As compared to various other types of position sensing detection, the approach described above and shown in FIGS. 4A-4B offers a number of benefits. For example, the assembly described above can provide direct car motion state/landing position feedback to be provided for dynamic compensation control as described herein. Further, depending on the sensor/tag configuration, embodiments can provide an ability to uniquely identify each floor which can eliminate need for correction runs. Additionally, advantageously, the calculated positions of the landing can be electronically adjusted for fine tuning after installation. Although described with respect to a specific example of a motion state sensing system, those of skill in the art will appreciate that various types and configurations of motion state sensors can be employed without departing from the scope of the present disclosure. For example, without limitation, non-contacting transmitter/receiver configurations, e.g., with vanes, sensors that convert translational motion to a measureable signal, e.g., rotary encoder on a guide roller, elevator car inertial motion sensors, e.g., accelerometers, etc. can all be employed without departing from the scope of the present disclosure.

Referring back to FIG. 3, as noted, the sensed motion state signals (e.g., position and velocity) are provided to the first feedback compensation element 322 and the second feedback compensation element 324. The first feedback compensation element 322 and the second feedback compensation element 324 are configured to output a reference motor speed which is then provided to the filter element 326. The filter element 326 also receives a third input 338. The third input 338 includes, in some configurations, landing floor data and/or current car load (e.g., weight). The third input 338 can be generated by various means including, but not limited to, weight sensors, position sensors, floor detection, etc. The filter element 326 is configured to filter and process the information from the first, second, and third inputs 334, 336, 338.

The filter element 326, according to embodiments of the present disclosure, is a dynamic compensation filter. In accordance with some embodiments, the dynamic compensation filter is classified as a Notch Filter with the purpose to counteract a resonance dynamic mode of the car in the elevator shaft. This natural mode (i.e., resonance dynamic mode) in the elevator system is dependent on a number of various factors. For example, as will be appreciated by those of skill in the art, the resonance dynamic mode may be dependent upon, without limitation, mass of the car itself, the length of the load bearing member(s) (and thus the landing floor of the location of the elevator car), load bearing member(s) arrangement, number of load bearing members, elastic properties of the load bearing members, the mass of a counterweight, rotational inertia of a drive motor, the mass inside the car, etc. Further, the Notch filter can be adjusted based on at least one of (i) hoistway dynamics as directly or implied by car motion state sensing, (ii) load weighing sensors, (iii) performance requirements, or (iv) instantaneous detection of car load. As such, the filter frequency is adjusted as one or more of these the factors vary. As will be appreciated by those of skill in the art, fundamentally the resonance dynamic mode would be the lowest frequency mode (above 0) for the elevator system with torque as an input and car position as output with the machine brake lifted.

Figure 5:
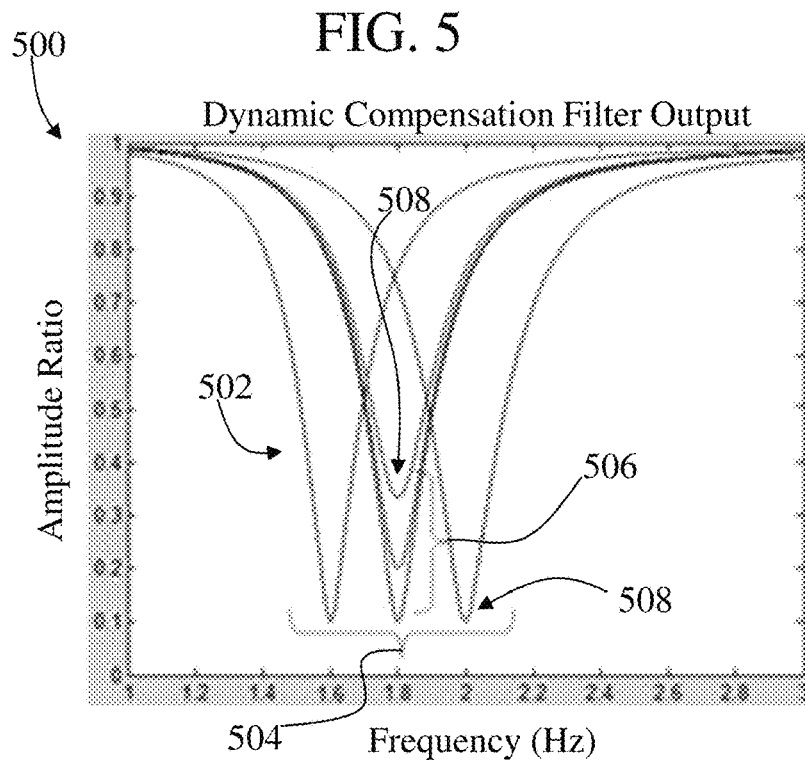
FIG. 5 an example dynamic compensation filter output plot that is employed with respect to filters incorporated into embodiments of the present disclosure.

For example, turning to FIG. 5, an example plot 500 of the filter element 326 in accordance with a non-limiting embodiment of the present disclosure is shown. In FIG. 5, the plot 500 represents a dynamic compensation filter output (e.g., an output of the filter element 326). As shown, frequency in Hertz is shown along the horizontal axis and an amplitude ratio is shown along the vertical axis. Those of skill in the art will appreciate that the amplitude ratio represents a gain multiplier that is applied to the inputs to the filter.

In the present example, in plot 500, the notch frequency, which ranges from 1.6 to 2.0 Hz, is adjusted to optimize the system response. The adjustment is illustrated by the five different curves 502 in plot 500, with three of the curves 502 showing adjustments in frequency, and three of the curves 502 illustrated adjustments in amplitude. The adjustments in frequency are illustrated within a frequency adjustment range 504 and the adjustments in amplitude are illustrated within an amplitude adjustment range 506. The frequency adjustment range 504 is provided to compensate for hoistway dynamics and the amplitude adjustment range 506 is maximize performance. The inflection point of each of the curves represents a notch frequency 508.

The plot 500 illustrates the frequency-dependent gain of the filter element 326. For example, at high and low frequencies the filter element 326 passes the signal (e.g., first, second, and third inputs 334, 336, 338) directly out with unity gain. However, at frequencies around the notch frequency 508 the response is attenuated (e.g., multiplied by a gain less than 1). Such action results in making the dynamic compensation control system 320 less sensitive, as compared to systems without such dynamic compensation control system, to car vibrations due to the natural bounce mode of the car in the hoistway.

As an example of operation of the filter element 326, an algorithm within the filter element 326 predicts a bounce mode frequency ($W_{bounce}$) as a function of the landing floor ($L_{flr}$) and the in-cab load (P): $W_{bounce}$=function($L_{flr}$, P), which is employed as a pre-defined algorithm in the dynamic compensation control system 320. From this, the filter element 326 (e.g., notch filter) is then set based on a predicted value of $W_{bounce}$. That is, the notch frequency 508 is predetermined based on variable factors related to the particular elevator system employing the dynamic compensation control system 320, including number of floors, empty weight of car, current floor, current total load of car, etc. Although a specific dynamic compensation filter is discussed herein, such discussion is merely for illustrative and explanatory purposes, and variations on the form of the dynamic compensation filter may be employed without departing from the scope of the present disclosure.

Advantageously, incorporating a filter element, such as a notch filter or other dynamic compensation filter, in embodiments of the present disclosure enables the dynamic compensation control system to be a high bandwidth system. That is, as provided herein, the dynamic compensation control system can respond very quickly (e.g., about 10 times faster than traditional releveling systems) without producing unwanted vertical elevator car vibration, bounce, excessive position deflections, or oscillations. The filter element, in accordance with the present disclosure, receives as input, both car position and velocity feedback signals, and knowledge of the landing floor and in-cab load to automatically adjust to optimize performance while minimizing or eliminating vibration levels.

To achieve minimization or elimination of bounce or vibration of the elevator car, the filter element 326 outputs a first control signal to a limiter 328. The limiter 328, in some embodiments, is a velocity limiter, which in turn outputs a velocity control signal (e.g., second control signal) to a machine velocity controller (MVC) element 330. The MVC element 330 also receives as input a fourth input 340. The fourth input 340 is a motor motion state signal related to the motor motion state of the elevator machine (e.g., velocity, position, etc. and combinations thereof).

The MVC element 330 outputs a third control signal to the machine torque controller (MTC) element 332. The MTC element 332 then outputs a fourth control signal, labeled control output 342. The control output 342 is a control signal to control current levels that are employed for controlling a motor drive system of the elevator machine. The motor drive system outputs the currents to generate a required motor torque, thus controlling torque of the elevator machine, and in turn controlling a motion state of an elevator car and leveling of the elevator car.

Thus, in one non-limiting example, car position and velocity signals can be passed through a car velocity feedback compensation element and a car position feedback compensation element, respectively. The feedback compensation elements generate an effective motor speed correction that is filtered through filter element 326 and limited by limiter element 328 prior to being sent to a motor speed control element 330.

As used herein, "high bandwidth" refers to effective feedback control closed-loop bandwidth. That is, as those of skill in the art will appreciate, the high bandwidth achieved by embodiments of the present disclosure is a frequency at which commanded input is effectively followed by the controlled output (usually specified to be at 50% ratio of output to input). For example, in some embodiments, the dynamic compensation control system may have a bandwidth around 2 Hz, which is well above the bandwidth traditionally required for conventional releveling control, in order to limit the amount of sag, bounce, oscillations, excessive position deflections, vibrations, etc. due to load changes in the car. The filter 326, e.g., a dynamic compensation filter, allows such bandwidth to be achieved.

Figure 6:
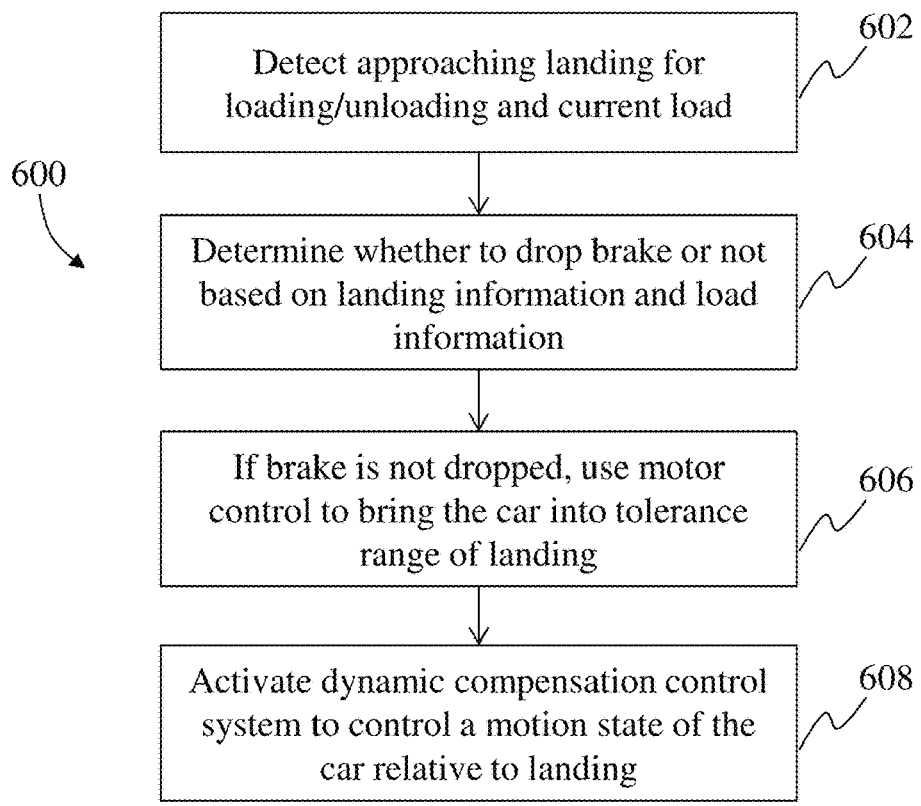
FIG. 6 is a flow process for operating and controlling an elevator system in accordance with an embodiment of the present disclosure.

Turning now to FIG. 6, a flow process 600 for controlling movement and operation of an elevator car within an elevator shaft is shown. The flow process 600 can be carried out by computing systems and/or dynamic compensation control systems as shown and described above and/or variations thereon. The flow process 600 includes electronic control elements (e.g., processors, etc.) and mechanical control elements (e.g., elevator machine, motor, etc.), hereinafter collectively referred to as control elements.

At block 602, the control elements detect an approach of an elevator car to a landing. Such detection may be a signal received with respect to operation of elevator call buttons operated by users of the elevator system. The elevator call buttons can be at the landings and activated when a user would like an elevator car called to their current floor. The elevator call buttons can also include destination entry buttons located within an elevator car that are activated by users within the elevator car. Further, the detection signal can be provided by electronic systems that are remote from the specific elevator system, such as intelligent elevator systems (kiosk requests, computer requests, mobile device requests, etc.). The approaching landing can also be detected using elevator car motion state sensors, as known in the art. For example, sensors at the landing can signal that the car is almost at the associated landing.

Based on the determined landing being approached, the dynamic compensation control system (or other control system) will determine if the brake should be engaged to secure and stop the elevator car at the landing, or if a "dynamic compensation control mode" of operation should be employed, at block 604. The determination can be predetermined or set within the system. For example, a preset determination can be based on the location of the particular landing within the elevator shaft (e.g., specific floors or landings always have dynamic compensation control performed). That is, for example, all floors at or below a specific landing may have the dynamic compensation control mode of operation, regardless of any other potential considerations. Such considerations may be based on a total height of the elevator system and designed to account for extension or stretching of load bearing elements that support the elevator car. Other considerations for determine (e.g., at floors above the designated one described above) may include current load within the elevator car, estimated load that may be entering the elevator car from the approaching landing, estimated load that may be exiting the elevator car to the approaching landing, detection of sag or oscillations occurring at a landing, or various other considerations.

If, at block 604, it is determined that the brake should not be dropped, at block 606, the motor of the elevator machine is controlled in a dynamic compensation control mode of operation to bring the elevator car into a tolerance range of the landing (e.g., within a predetermined distance to enable level floors between the elevator car and the landing when the elevator car doors are opened).

At block 608, once the elevator car is approximately leveled at the landing, the dynamic compensation control system is activated to ensure that the elevator car does not bounce, vibrate, excessively deflect, or otherwise oscillate. The dynamic compensation control system is operated as described above with respect to FIGS. 3 and 5, receiving inputs and generating a torque control output current to control the motor and thus control a dynamic compensation control mode of operation and the motion state of an elevator car relative to a landing.

Advantageously, embodiments of the present disclosure provide elevator motion state control employing dynamic compensation control systems. The dynamic compensation control systems, advantageously, can reduce car oscillation peak deflections with high-bandwidth control. Such control can be achieved very quickly, for example, acting in less than 0.1 seconds to attenuate deflections by 30-50%. To achieve such fast reaction time, embodiments provided herein employ one or more motion state feedback signals received from one or more associated motion state sensors that are configured to monitor one or more motion states of an elevator car.

Advantageously, embodiments provided herein employ dynamic compensation control systems that allow high gain feedback to be used without exciting vibration modes within the elevator system. For example, by having a filter as described herein (e.g., dynamic compensation filter, notch filter, etc.) excitation of vibration modes can be accounted for and avoided. The dynamic compensation filter compensates for bounce mode response and is adjusted based on the load in the elevator car and the current landing floor.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments. For example, various different types of motion state sensors can be employed without departing from the scope of the present disclosure.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method of controlling an elevator system, the method comprising:
   detecting a landing of a stop for an elevator car;
   determining load information of a load carried by the elevator car and associated with a stopping of the elevator car at the detected landing;
   controlling the stopping of the elevator car at the landing using an elevator machine based on the detected landing and the load information; and performing dynamic compensation control of a motion state of the elevator car relative to the landing with a computing system and the elevator machine based on the detected landing and load information,
wherein the dynamic compensation control comprises:
receiving motion state information related to at least one motion state of the elevator car at the computing system;
receiving landing information associated with the detected landing and the load information at the computing system;
applying a Notch filter to the received information and generating a first control signal, wherein the Notch filter is adjusted based on at least one of hoistway dynamics and performance requirements, and wherein the Notch filter is configured to predict a bounce mode frequency as a function of the landing of the stop and the load information; and
producing a control output from the first control signal to control the elevator machine to minimize oscillations, vibrations, excessive position deflections, and/or bounce of the elevator car at the detected landing,
wherein the motion state information comprises (i) an absolute position of the elevator car within an elevator shaft and (ii) at least one of a car velocity and a car acceleration,
wherein the absolute position of the elevator car is determined using a plurality of inductive sensors, the inductive sensors include a tag assembly arranged within the elevator shaft proximate the detected landing and a sensor assembly arranged on the elevator car, wherein the sensor assembly is configured to inductively interact with the tag assembly to determine an absolute position of the elevator car within the elevator shaft.

2. The method of claim 1, wherein the control output is a current to generate a motor torque at the elevator machine.

3. The method of claim 1, further comprising applying a limiter to the first control signal to produce a second control signal.

4. The method of claim 3, further comprising:
receiving the second control signal at a machine velocity controller;
receiving a motor velocity signal related to a motor velocity of the elevator machine; and
generating a third control signal.

5. The method of claim 4, further comprising receiving the third control signal at a machine torque controller and outputting the control output from the machine torque controller to control a torque of the elevator machine.

6. The method of claim 1, wherein the load information comprises at least one of (i) a current load within the elevator car, (ii) an estimated change in load due to load exiting the elevator car onto the landing, or (iii) an estimated change in load due to load entering the elevator car from the landing.

7. The method of claim 1, further comprising determining the dynamic compensation control is not required based on at least one of the load information and the detected landing.

8. An elevator control system comprising:
an elevator machine operably connected to an elevator car located within an elevator shaft;
at least one motion state sensor arranged to detect a motion state of the elevator car within the elevator shaft;
at least one load sensor arranged to detect a load of the elevator car; and
a computing system in communication with the at least one motion state sensor and the at least one load sensor, the computing system configured to perform dynamic compensation control of the elevator car based on a detected landing where the elevator car will be stopping and a measured load;
wherein the dynamic compensation control comprises:
receiving motion state information related to the elevator car at the computing system from the at least one motion state sensor to generate a motion state signal;
receiving one or more load information signals at the computing system from the at least one load sensor;
applying a Notch filter to the motion state signal and the one or more load information signals and generating a first control signal, wherein the Notch filter is adjusted based on at least one of hoistway dynamics and performance requirements, and wherein the Notch filter is configured to predict a bounce mode frequency as a function of the landing of the stop and the one or more load information signals; and
producing a control output from the first control signal to control the elevator machine to minimize oscillations, vibrations, excessive position deflections, and/or bounce of the elevator car at the detected landing where the elevator car is making a stop,
wherein the motion state information comprises (i) an absolute position of the elevator car within the elevator shaft and (ii) at least one of a car velocity and a car acceleration, and
wherein the elevator control system comprises a plurality of inductive sensors configured to determine the absolute position of the elevator car within the elevator shaft, the inductive sensors include a tag assembly arranged within the elevator shaft proximate the detected landing and a sensor assembly arranged on the elevator car, wherein the sensor assembly is configured to inductively interact with the tag assembly to determine an absolute position of the elevator car within the elevator shaft.

9. The system of claim 8, wherein the control output is a current to generate a motor torque at the elevator machine.

10. The system of claim 8, further comprising applying a limiter to the first control signal to produce a second control signal.

11. The system of claim 10, further comprising:
receiving the second control signal at a machine velocity controller;
receiving a motor velocity signal related to a motor velocity of the elevator machine; and
generating a third control signal.

12. The system of claim 11, further comprising receiving the third control signal at a machine torque controller and outputting the control output from the machine torque controller to control a torque of the elevator machine.

13. The system of claim 8, wherein the one or more load information signals comprises at least one of (i) a current load within the elevator car, (ii) an estimated change in load due to load exiting the elevator car onto the detected landing, or (iii) an estimated change in load due to load entering the elevator car from the detected landing.

14. The system of claim 8, further comprising determining the dynamic compensation control is not required based on at least one of the one or more load information signals and the detected landing.

15. The system of claim 8, wherein the Notch filter is adjusted based on at least one of (i) hoistway dynamics as directly or implied by car motion state sensing, (ii) load weighing sensors, (iii) performance requirements, or (iv) instantaneous detection of car load.

16. The system of claim 8, wherein the at least one motion state sensor comprises a plurality of sensing elements located on the elevator car and a corresponding set of tag elements located at each landing of a plurality of landings along the elevator shaft.

17. The system of claim 16, wherein the plurality of sensing elements and corresponding tag elements at each landing form overlapping detection regions.

* * * * *